Sept. 8, 1936.　　　　N. J. CAVAGNARO　　　　2,053,322
CONVEYER BELT FOR DRIERS
Filed March 27, 1936　　　2 Sheets-Sheet 1
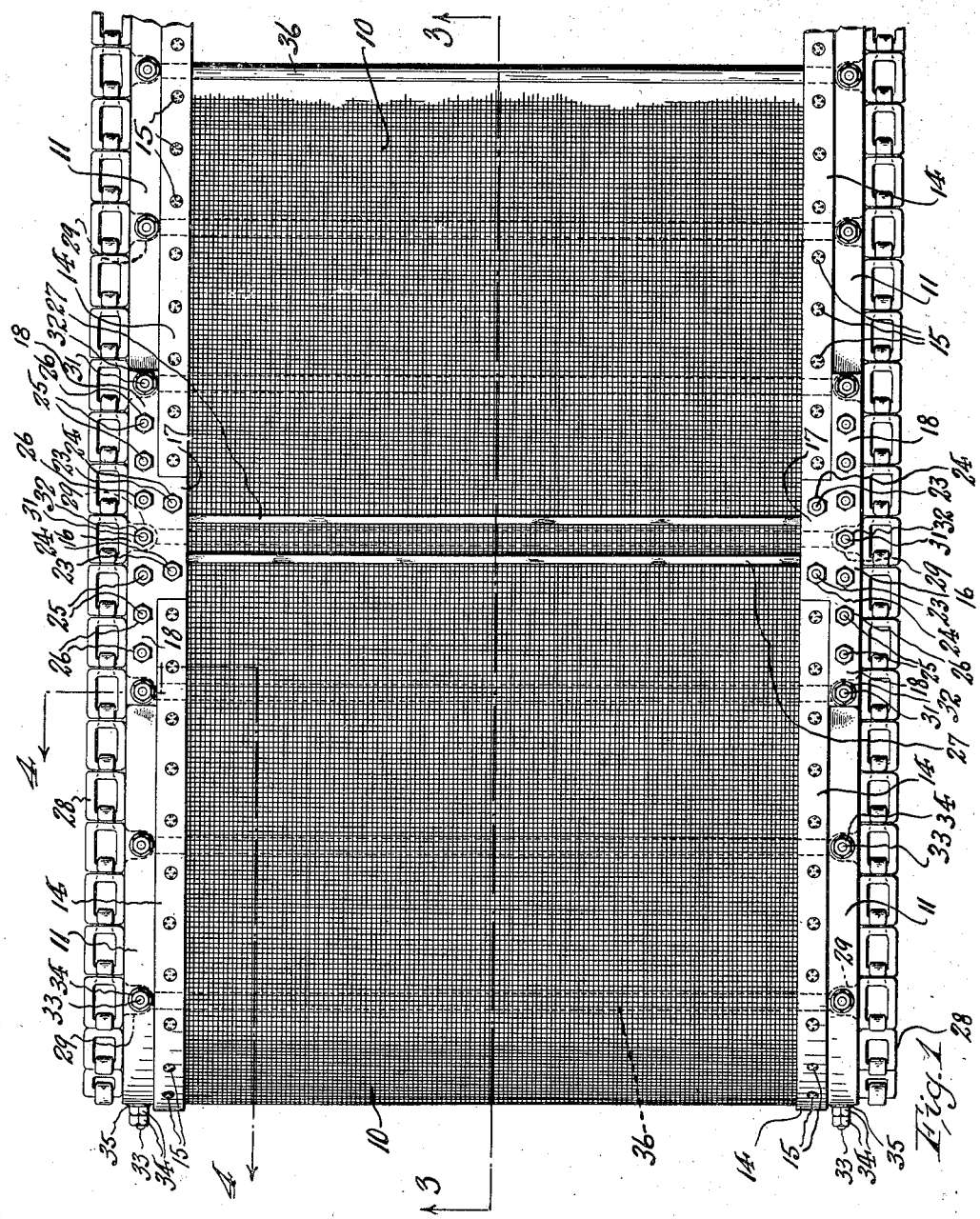
INVENTOR.
Nicholas J. Cavagnaro,
BY
George D. Richards
ATTORNEY.

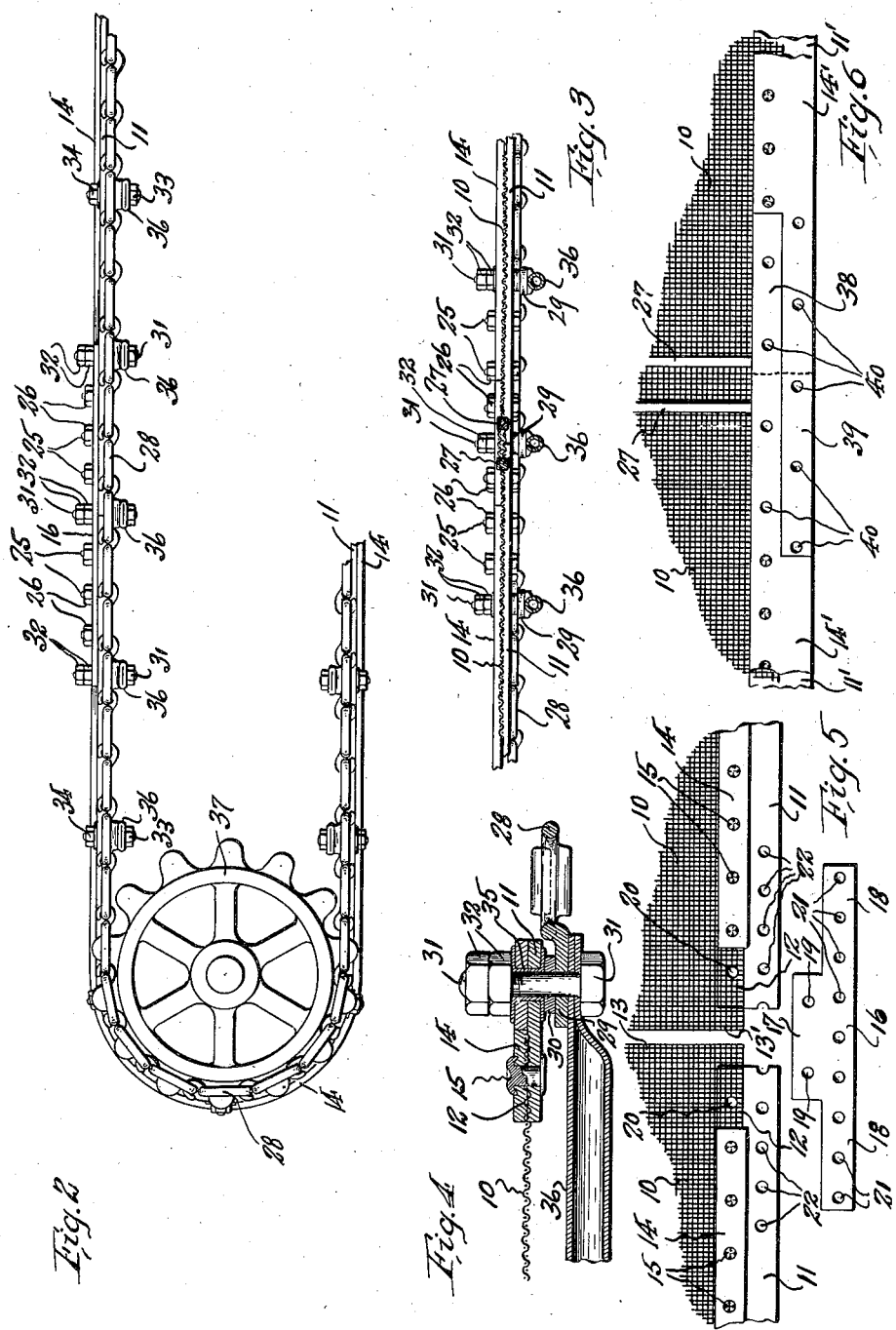

Patented Sept. 8, 1936

2,053,322

UNITED STATES PATENT OFFICE 2,053,322

CONVEYER BELT FOR DRIERS

Nicholas J. Cavagnaro, Richmond Hill, N. Y., assignor to Consolidated Macaroni Machine Corporation, Brooklyn, N. Y., a corporation of New York Application March 27, 1936, Serial No. 71,166

11 Claims. (Cl. 198—194)

This invention relates to improvements in endless conveyer belts for alimentary paste driers and similar apparatus and the invention has reference, more particularly, to a novel construction of sprocket chain driven mesh screen belt having a novel means for so connecting the chains thereto as to relieve the mesh screen material from tearing, splitting or rupturing strains under the pull of said chains, and also having a novel means for laterally spreading the mesh screen belt body.

This invention has for its principal object to provide a novel endless conveyer belt, comprising a wire mesh body having its longitudinal marginal portions secured by flexible binding structures having outer marginal portions extending beyond the enclosed bound margins of the wire mesh body, to which outer marginal portions are secured, for disposition along the outside edges thereof, outwardly offset sprocket chain means for supporting the body in connection with sprockets adapted to impart motion thereto; the arrangement being such that the wire mesh body is not directly subjected, in operation, to the pulling strains exerted by the chain connections, with resultant tendency to cause tranverse splitting or other rupture of said body.

The invention has for a further object to provide, in a belt structure of the kind mentioned, transverse spreader rods which are connected to and between the driving chains, and which are operative to laterally spread the wire mesh body while at the same time protecting the same against lateral pulling or stretching strains.

The invention has for another object to provide a novel joint structure for coupling or joining together meeting ends of said binding structures, said joint structures being cooperative with the seam structure whereby the meeting ends of the wire mesh body are united to form an endless arrangement thereof.

With the above stated objects in view, this invention seeks to provide a strong, durable and wear resisting belt construction, the wire mesh body of which is efficiently guarded against tearing, splitting, rupture or breaking away from the driving chains by which it is carried and driven.

An illustrative embodiment of this invention is shown in the accompanying drawings, in which:

Fig. 1 is a fragmentary plan view of the novel endless conveyer belt according to this invention; Fig. 2 is a side edge elevation thereof; and Fig. 3 is a fragmentary longitudinal sectional view, taken on line 3—3 in Fig. 1.

Fig. 4 is a fragmentary transverse vertical section, taken on line 4—4 in Fig. 1, but drawn on an enlarged scale.

Fig. 5 is a fragmentary plan view of the meeting ends of the belt body and its binding structure together with joint forming means therefor shown disassembled and before attachment thereto of driving sprocket chain means.

Fig. 6 is a fragmentary plan view of the meeting ends of the belt body and its binding structure provided with a modified joint forming means.

Similar characters of reference are employed in the above described views, to indicate corresponding parts.

Referring to the drawings, the reference character 10 indicates a wire mesh body of suitable width and length, the ends of which are to be joined to form the ultimate endless conveyer belt. Underlying the longitudinal marginal portions of said body 10, at each side thereof, is a bottom binder strip 11 of suitable width, the same being made of some comparatively tough flexible material, such e. g. as leather. The longitudinal marginal portions of said body 10 are overlapped, as at 12 (see Fig. 5), upon said bottom binder strip for distance approximating one-half the width of the latter. Said body 10 somewhat exceeds in length the lengths of said bottom binder strips 11 so that, when the latter are joined end to end, freely projecting end portions 13 and 13′ (see Fig. 5) of the main body 10 are provided, the same being adapted to assume an overlapping relation when the said bottom binder strip ends are butted and joined together, thereby forming the desired and joined together, thereby forming the desired endless belt structure. Disposed to overlie the side marginal portions 12 of the mesh body 10, as lapped upon the bottom binder strip 11, is a top binder strip 14. Said top binder strip 14 is, in one form of the binding structure as shown in Figs. 1 to 5 inclusive, of reduced width as compared with bottom binder strip 11, being substantially approximately one-half the width of the latter. Said top binder strips 14 are of less length, however, than that of the bottom binder strip 11, so that when the latter are joined end to end, a gap is left between the opposed ends of said top binder strips for purposes to be subsequently set forth. Said bottom and top binder strips with the interposed side marginal portions 12 of the mesh body are strongly secured together by passing therethrough, and fixing in place at suitable longitudinal intervals throughout the length thereof, fastening rivets 15.

The means for joining or coupling the meeting ends of said bottom binder strips together to form the desired endless belt structure comprises a joint strip 16, which is preferably made of the same tough flexible material as that composing the binder strips per se, e. g. leather. Each joint strip 16 is provided with a central portion 17 of a width approximating the full width of a bottom binder strip 11 and of a length to fit into the above-mentioned gap left between the opposed ends of the associated top binder strip 14 when the belt ends are opposed and brought together for joining. Each joint strip 16 is further provided with oppositely extending end portions 18 of reduced width coincident with the outside margins thereof; these end portions 18 being arranged to overlie a bottom binder strip 11 parallel to and outwardly of the end portions of the associated top binder strip 14. Provided in the inwardly projecting part of the central portion 16 of each joint strip are longitudinally spaced openings 19 which match correspondingly disposed openings 20 provided for extension through a bottom binder strip 11 and the overlapping side marginal portions 12 of the mesh body 10. In like manner, extending through the outside marginal portions of each joint strip 16, including the oppositely extending end portions 18 thereof, is a row of longitudinally spaced openings 21 which match correspondingly disposed openings 22 provided in the outlying marginal portions of lower binder strip 11.

When the belt ends are opposed and brought together for joining, the joint strips 16 are overlaid upon the butted end portions of the bottom binder strip 11 between and contiguous to the top binder strip end portions, whereupon bolts 23 are passed through the registered openings 19—20 and secured by nuts 24. In like manner bolts 25 are engaged through certain of the registered openings 21—22 and secured by nuts 26. In this manner the binder strips 11—14 are spliced or interjoined, and the end portions 13—13' of the mesh body 10 transversely overlapped one upon the other. Said mesh body 10 is then joined into an endless formation by soldering the free margins of the end portions 13 and 13' to the body, thus producing strong transversely extending seams or connections 27 throughout and across the width of the mesh body 10.

After the belt body and its binding structures have been joined into an endless form as above described, driving sprocket chains 28 are connected to extend along the outer margins of the binding structures. Certain equi-spaced links of said chains are provided with inwardly and somewhat downwardly offset perforate ears or lugs 29. These ears or lugs 29 extend beneath the outer marginal portions of the bottom binding strips 11, and may be spaced therefrom by spacing washers 30 (see Fig. 4), if desired. Such of the ears or lugs 29 as underlie the location of the joint strips 16 are aligned with registered openings 21—22 so that fastening bolts 31 may be passed through these parts and secured by nuts 32, thus attaching the chains at such points. Such of the ears or lugs 29 as underlie the remaining longitudinal extent of the bottom binder strip 11 are likewise attached thereto by bolts 33 and nuts 34. It is preferable that the bolts thus connecting the chains to the binding structures somewhat loosely fit the openings of the latter through which they pass, so that the flexibiliy of the binding structures is not unduly reduced. It is also preferable that the openings for said bolts, as provided in the binding structures, be reenforced against wear and tear by providing the same with hollow or tubular metallic eyelets through which said bolts extend. From the described arrangement of the chain attaching means, it will be seen that the securing bolts do not pass through the marginal portions of the wire mesh body, but only through portions of the binding structures exteriorly of said body, and consequently the play of and resultant stress or strain exerted on said bolts by the pull of the chains is not communicated directly to the wire mesh body with tendency to cause tearing, splitting or other running ruptures of the wire mesh material, as would otherwise be the case.

To retain the belt spread against lateral collapse and sagging, as well as to prevent transmission of lateral stretching or tearing strains and stresses to the wire mesh body 10 thereof, spreader rods 36 are connected to and between the chain 28, the same extending beneath the under or inner side of the belt body. These spreader rods are preferably, although not necessarily, of tubular form with their respective ends underlying laterally opposite ears or lugs of the opposite chains, and being secured to said ears or lugs by the same bolts and nuts which serve to attach the chains to the sides of the belt structure. In the drawings, such spreader rods 36 are shown extending between all of the ears or lugs of the respective chains, so that a rod extends from every third link of the chains; it will be understood, however, that the rods 36 may be spaced at greater intervals, if desired, as e. g. by attaching the same so that a rod extends from every sixth link; and in fact, the spacing of the lug or ear carrying links as well as the spacing of the spreader rods is subject to more or less wide variation as will be to best advantage considering the length, size and desired load carrying capacity of the belt structure in any given case. It will be obvious that the chains, when applied to driving sprockets, as 37 in Fig. 2, will both adequately support the conveyer belt as well as move the same for the performance of the carrying functions desired thereof.

Some modification of the binding structures and associated joint arrangements therefor is, of course, possible, and consequently in its broader aspects this invention is not limited to the exact details of the constructions above set forth. For example, as shown in Fig. 6, the top binder strip therein illustrated and indicated by the reference character 14' may be of the same width as the bottom binder strip 11', and may be provided with matching reduced end portions 38 and 39 which will overlie the abutted end portions of the bottom binder strip 11', said end portions 38 and 39 and the underlying portions of the bottom binder strip 11' having matched openings 40 to receive coupling bolts and chain attaching bolts as will be apparent from an inspection of said Fig. 6.

Having now described my invention, I claim:

1. A conveyer belt, comprising a wire mesh body having its ends secured together to form an endless arrangement thereof, flexible binding structures enveloping and securing by their inner marginal portions the longitudinal side marginal portions of said body, a joint forming means coupling the ends of said binding structures, sprocket chains bordering the outer margins of said binding structures, and means for securing said chains to the outer marginal portions of said binding structures only so as to eliminate direct communication therethrough to the wire mesh body of the stresses consequent upon working movements of the chains.

2. A conveyer belt, comprising a wire mesh body having its ends secured together to form an endless arrangement thereof, flexible binding structures enveloping and securing by their inner marginal portions the longitudinal side marginal portions of said body, a joint forming means coupling the ends of said binding structures, sprocket chains bordering the outer margins of said binding structures, and means for securing said chains to the outer marginal portions of said binding structure only so as to eliminate direct communication therethrough to the wire mesh body of the stresses consequent upon working movements of the chains, and lateral spreader rods connected to and extending between said chains and beneath said body.

3. A conveyer belt, comprising a wire mesh body having its ends secured together to form an endless arrangement thereof, bottom binder strips of tough but flexible material upon the inner marginal portions of which the side marginal portions of said body are overlapped, top binder strips of similar material covering said lapped portions of said body and secured therewith to said bottom binder strip, joint forming means coupling the ends of said bottom binder strips, and sprocket chains bordering and secured to the outer marginal portions of said bottom binder strips so as to prevent communication of the stresses of working movements of the chains directly to said wire mesh body.

4. A conveyer belt, comprising a wire mesh body having its ends secured together to form an endless arrangement thereof, bottom binder strips of tough but flexible material upon the inner marginal portions of which the side marginal portions of said body are overlapped, top binder strips of similar material covering said lapped portions of said body secured therewith to said bottom binder strip, joint forming means coupling the ends of said bottom binder strips, sprocket chains bordering and secured to the outer marginal portions of said bottom binder strips so as to prevent communication of the stresses of working movements of the chains directly to said wire mesh body, and lateral spreader rods connected to and extending between said chains and beneath said body.

5. A conveyer belt, comprising a wire mesh body having its ends secured together to form an endless arrangement thereof, bottom binder strips of tough but flexible material upon the inner marginal portions of which the side marginal portions of said body are overlapped, top binder strips of similar material covering said lapped portions of said body and secured therewith to said bottom binder strip, joint forming means coupling the ends of said bottom binder strips, sprocket chains bordering the outer margins of said bottom binder strips, certain longitudinally spaced apart links of said chains having perforate ears extending beneath said bottom binder strips, and bolts extending through said ears and the outer marginal portions of said bottom binder strips for securing said chains to the latter but without direct contact with the wire mesh body.

6. A conveyer belt, comprising a wire mesh body having its ends secured together to form an endless arrangement thereof, bottom binder strips of tough but flexible material upon the inner marginal portions of which the side marginal portions of said body are overlapped, top binder strips of similar material covering said lapped portions of said body and secured therewith to said bottom binder strip, joint forming means coupling the ends of said bottom binder strips, sprocket chains bordering the outer margins of said bottom binder strips, certain longitudinally spaced apart links of said chains having perforate ears extending beneath said bottom binder strips, bolts extending through said ears and the outer marginal portions of said bottom binder strips for securing said chains to the latter, and lateral spreader rods extending between laterally opposed ears of said chains and also connected thereto by said bolts.

7. A conveyer belt, comprising a wire mesh body, bottom binder strips of tough but flexible material upon which the longitudinal side marginal portions of said body are overlapped, said bottom binder strips terminating short of the ends of said body whereby when said strip ends are brought together said body ends will overlap one another, said overlapping body ends being secured by solder formed seams, top binder strips of similar material covering said lapped side marginal portions of said body and being secured therewith to said bottom binder strip, joint forming means coupling the ends of said bottom binder strips, and sprocket chains bordering and secured to the outer marginal portions of each said bottom binder strip.

8. A conveyer belt, comprising a wire mesh body, bottom binder strips of tough but flexible material upon which the longitudinal side marginal portions of said body are overlapped, said bottom binder strips terminating short of the ends of said body whereby when said strip ends are brought together said body ends will overlap one another, said overlapping body ends being secured by solder formed seams, top binder strips of similar material covering said lapped side marginal portions of said body and being secured therewith to said bottom binder strip, joint forming means coupling the ends of said bottom binder strips, sprocket chains bordering the outer margins of said bottom binder strips, certain longitudinally spaced apart links of said chains having perforate ears extending beneath said bottom binder strips, chain securing bolts extending through said ears and the outer marginal portions of bottom binder strips beyond the bound edges of the wire mesh body, and lateral spreader rods extending between laterally opposed ears of said chains and also connected thereto by said bolts.

9. A conveyor belt, comprising a wire mesh body, bottom binder strips of tough but flexible material upon the inner marginal portions of which the side marginal portions of said body are overlapped, said bottom binder strips terminating short of the ends of said body whereby when said strip ends are brought together said body ends will overlap one another, said overlapping body ends being secured by solder formed seams, flexible top binder strips of less width than said bottom binder strips, means to secure said bottom and top strips together in holding relation to said body side marginal portions, said top binder strips terminating short of the ends of said bottom binder strip to form an intervening gap, joint strips disposed within said gaps and over the meeting ends of said bottom binder strips, said joint strips having oppositely extending reduced end portions paralleling the end portions of said top binder strips, said joint strips and underlying portions of said bottom binder strips having a plurality of matched openings, and fastening bolts extending through said openings.

10. A conveyer belt, comprising a wire mesh body, bottom binder strips of tough but flexible material upon the inner marginal portions of which the side marginal portions of said body are overlapped, said bottom binder strips terminating short of the ends of said body whereby when said strip ends are brought together said body ends will overlap one another, said overlapping body ends being secured by solder formed seams, flexible top binder strips of less width than said bottom binder strips, means to secure said bottom and top strips together in holding relation to said body side marginal portions, said top binder strips terminating short of the ends of said bottom binder strip to form an intervening gap, joint strips disposed within said gaps and over the meeting ends of said bottom binder strips, said joint strips having oppositely extending reduced end portions paralleling the end portions of said top binder strips, said joint strips and underlying portions of said bottom binder strips having a plurality of matched openings, fastening bolts extending through said openings, sprocket chains bordering the outer margins of said bottom binder strips, certain longitudinally spaced links of said chain having perforate ears extending beneath said bottom binder strips, and chain securing bolts including certain of said afore-mentioned fastening bolts extending through said ears and the outer marginal portions of said bottom binder strips outwardly of the edges of said wire mesh body.

11. A conveyer belt, comprising a wire mesh body, bottom binder strips of tough but flexible material upon the inner marginal portions of which the side marginal portions of said body are overlapped, said bottom binder strips terminating short of the ends of said body whereby when said strip ends are brought together said body ends will overlap one another, said overlapping body ends being secured by solder formed seams, flexible top binder strips of less width than said bottom binder strips, means to secure said bottom and top strips together in holding relation to said body side marginal portions, said top binder strips terminating short of the ends of said bottom binder strip to form an intervening gap, joint strips disposed within said gaps and over the meeting ends of said bottom binder strips, said joint strips having oppositely extending reduced end portions paralleling the end portions of said top binder strips, said joint strips and underlying portions of said bottom binder strips having a plurality of matched openings, and fastening bolts extending through said openings, sprocket chains bordering the outer margins of said bottom binder strips, certain longitudinally spaced links of said chains having perforate ears extending beneath said bottom binder strips, chain securing bolts including certain of said afore-mentioned fastening bolts extending through said ears and the outer marginal portions of said bottom binder strips outwardly of the edges of said wire mesh body, and lateral spreader rods extending between laterally opposed ears of said chains and connected thereto by said chain securing bolts.

NICHOLAS J. CAVAGNARO.